April 28, 1964      O. MEYER      3,130,952
SEALING MEANS FOR HIGH PRESSURE VALVES
Filed Jan. 11, 1961      3 Sheets-Sheet 1

INVENTOR.
OTTO MEYER
BY

INVENTOR.
OTTO MEYER

April 28, 1964  O. MEYER  3,130,952
SEALING MEANS FOR HIGH PRESSURE VALVES
Filed Jan. 11, 1961  3 Sheets-Sheet 3

INVENTOR.
OTTO MEYER
BY
Bair, Freeman & Molinare
attys

United States Patent Office 3,130,952
Patented Apr. 28, 1964

3,130,952
SEALING MEANS FOR HIGH PRESSURE VALVES
Otto Meyer, Ehlershausen, Lehrte, Germany
Filed Jan. 11, 1961, Ser. No. 82,104
Claims priority, application Germany Jan. 26, 1960
11 Claims. (Cl. 251—175)

This invention relates to improvements in sealing rings for valves and especially for valves intended for use with high pressures.

In the known constructions of valves the sealing rings are disposed in recesses, either in the housing or in the shut-off member. The walls of the recess serve as a guide for axial displacement of the ring towards the associated sealing surface on either the shut-off member or on the housing.

In this case, if the end face of the sealing ring which is remote from the sealing surface and which is subjected to the conduit pressure is larger in area than the portion of the opposite end face of the sealing ring which contacts the cooperating sealing surface, the sealing ring is urged against the sealing surface with a force which is proportional to the conduit pressure. This causes the opening through the valve to be sealed off by the ring. This force may be selected as desired by appropriate matching of the sizes of the two end faces. To insure complete shut-off, however, the cooperating sealing faces must be accurately machined which greatly increases the cost of the valve.

In order to improve the sealing action of the known rigid sealing rings, it has already been proposed that a seal of resilient material be set in its end face, for example in the form of a loop ring or a vulcanized rubber filling which is inserted in an appropriate groove in the end face of the sealing ring.

Here, too, the gap between the seal and the sealing surface must be sufficiently small to prevent the resilient seal from being pressed out into the gap under high fluid pressures. Accordingly, accurate machining of the sealing surface is also necessary in this case. In addition, a resilient seal which is immovably mounted in a groove in the sealing ring suffers severe abrasion during operation of the valve, so that it finally no longer projects from the end face of the sealing ring as is necessary for effective sealing, and moreover it may be completely broken after being operated only a few times.

The primary object of the invention is to provide an improved seal for high pressure valves which obviates the aforementioned difficulties, particularly the need for accurately machining the mating parts.

Another object is to provide a valve in which the sealing ring is of relatively soft, resilient material and is backed up or reinforced by a rigid ring, both of which are adapted to slide axially within a recess in either the valve closure member or the valve body to provide a seal against the mating part.

Another object is to provide such a valve seal in which the resilient ring has a lip formed in its inner edge (remote from the sealing edge) which bears against the side wall of the recess to prevent flow via the recess when the valve is closed.

Still another object of the invention is to provide a spring actuated plate within the confines of and overlying the inner edges of the resilient and rigid rings which plate urges the ring members into engagement with the mating surface of the seal assembly to supplement the force of the fluid pressure on the inner enlarged edge of the resilient ring.

Another object is to provide a valve which seals under negative as well as positive pressure in the conduit to which the valve is connected.

According to a preferred form of the invention, the movable valve member inside the body is recessed to receive and guide axially a sealing ring consisting of a rigid outer supporting ring and an inner ring of resilient material, adapted to seal against the margin of the body surrounding the port therethrough. The inner ring is constructed, at its end remote from the cooperating sealing surface, in the form of a lip seal which bears against the side wall guide surface of the recess, the external diameter of the inner ring at said end being substantially equal to the external diameter of the rigid supporting ring, and at the end adjacent to the sealing surface being substantially equal to the internal diameter of the supporting ring. The depth of the recess is greater than the height of the composite sealing ring.

Preferably a plate which bears resiliently against the end face of the recess in the shunt-off member is mounted on the end face of the sealing ring remote from the sealing surface.

This construction affords excellent sealing as a result of the fluid pressure medium in the conduit, since the medium passes through the bores in the plate and presses the sealing ring against its sealing surface, no accurate machining of the sealing surface being necessary. Moreover, as of a result of the particular arrangement of the resilient inner ring, no appreciable wear occurs even with frequent operation. As the supporting ring bears together with the resilient inner ring against the sealing surface, the formation of a gap into which the material of the resilient ring could escape is avoided and a relatively larger gap, which facilitates production, may be present between the shut-off member and the sealing surface on the valve body or housing.

Furthermore, the sealing action is not affected even by the wear of the resilient ring which effects the actual sealing because this ring is constantly pushed further towards the sealing surface by the pressure of fluid which acts on the end face remote from the sealing surface. It has been found that when the sealing ring according to the invention is installed at the admission side, that is to say on the pressure side, in the shut-off member, for example the valve plug of a valve, practically no wear at all occurs on the resilient ring, even after operation about a thousand times under load at a pressure of 70 to 380 atm., despite the fact that the resilient ring only has a thickness of about 2 mm., because during the opening process, the whole sealing element immediately springs back in the direction of flow and is thus detached from the sealing surface.

The required sealing between the sealing ring and the sealing surface is only maintained, however, with the construction of the plate as described, so long as the conduit to be sealed off is under pressure. If this pressure drops to a great extent or actually passes into the negative pressure range, the seal may become ineffective as a result of the relief of pressure on the sealing ring which takes place through the bores in the plate.

This applies, for example, to valves which are interposed between two pressure systems, the pressure differential of which may vary quickly or slowly either regularly or irregularly, while fluctations in pressure varying from high excess pressure into the negative pressure range may take place on one side or the other of the valve.

In a further development of the invention, therefore, a seal is provided which is effective both under positive pressure and under negative pressure. According to this embodiment of the invention, the plate which is mounted on the end face of the sealing ring remote from the sealing surface, is constructed in the form of a closed plate, that is to say without bores. This plate thus acts to some extent like a non-return valve, because under the influence of pressure it is lifted from the adjacent end face of the sealing ring and allows the pressure of fluid in the conduit to act on this end face of the sealing ring as a result of which the sealing ring is pressed tightly against the sealing surface. If the pressure in the conduit drops abruptly, however, for example down to the negative pressure range, then under the influence of the pressure prevailing in the space between the plate and the end of the recess in the shut-off member, the plate moves towards the end face of the sealing ring remote from the sealing surface and bears tightly thereon, as a result of which the sealing ring still remains pressed tightly against its sealing surface.

Some embodiments of the invention will now be described by way of example with reference to the accompanying drawings, in which.

Figure 2:
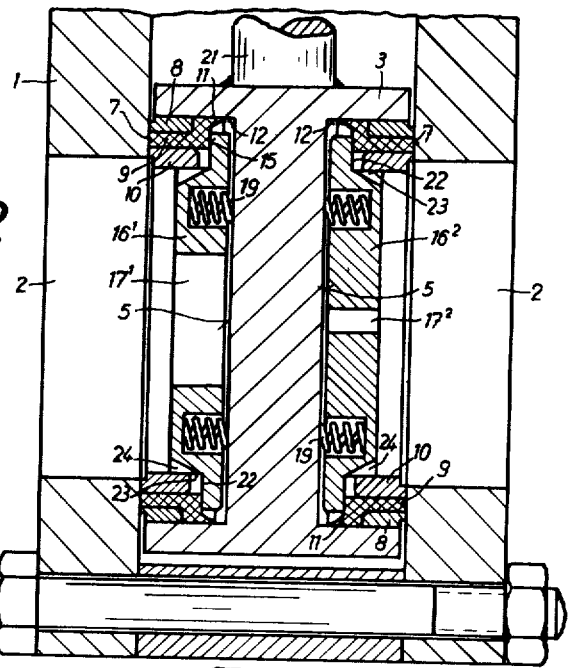
FIGURE 2 shows a section through a slide-valve arrangement provided with sealing rings according to the invention on each side of the slide member, sealing likewise being provided only for positive pressure sealing.
Figure 3:
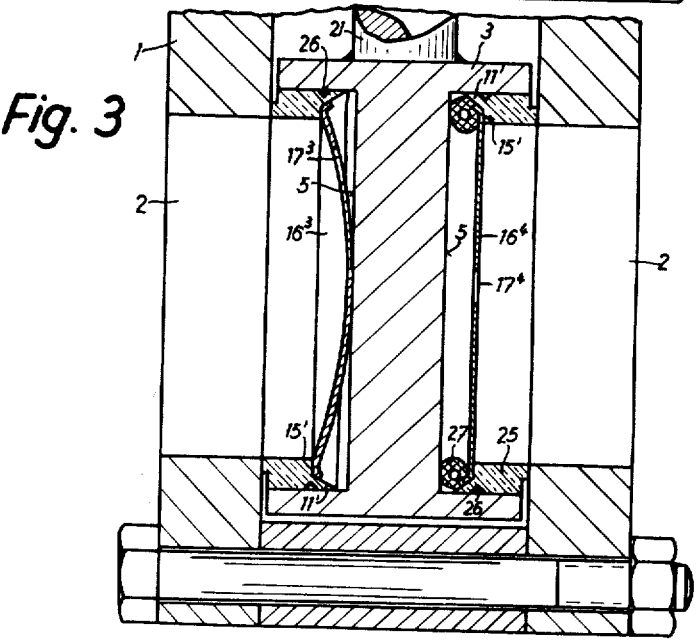
Figure 4:
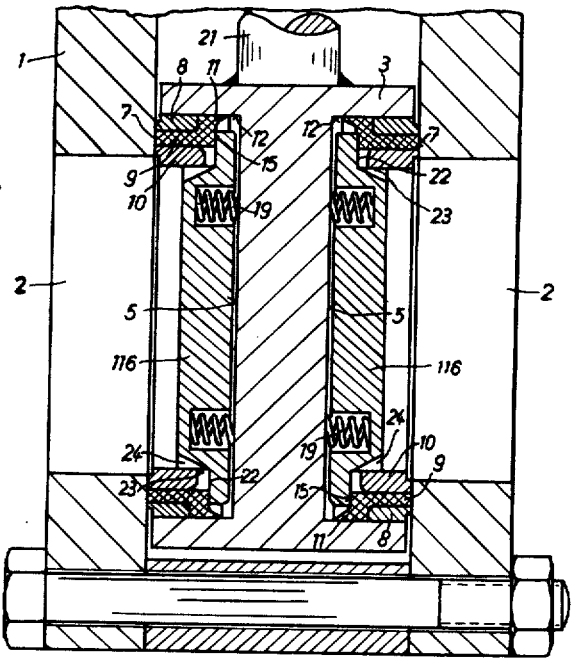
Figure 5:
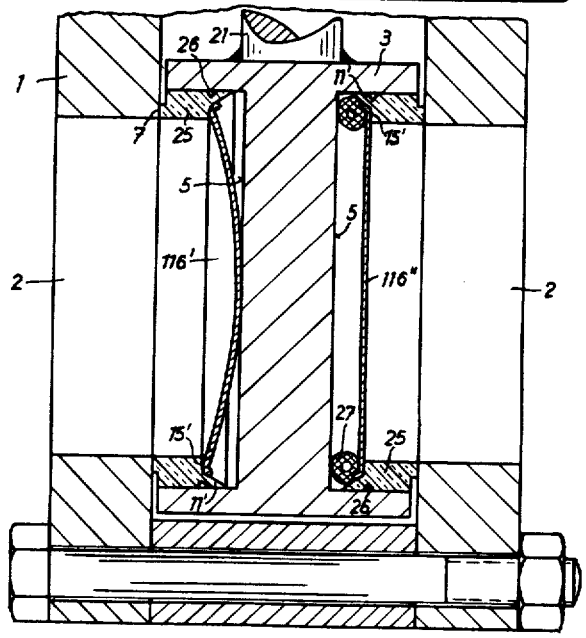

FIGURE 3 likewise shows a section through a slide-valve arrangement provided with sealing rings according to the invention on each side of the slide member for positive pressing sealing, but with a plate of a different construction from that shown in FIGURE 2; and FIGURES 4 and 5 are sections through slide-valve arrangements as shown in FIGURES 2 and 3 respectively, but with seals which are effective for positive and negative pressures.

Figure 1:
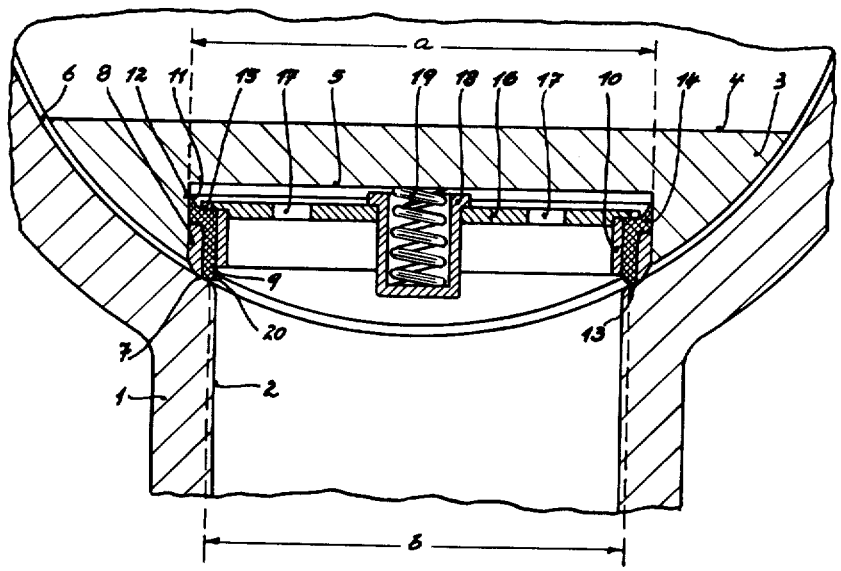
FIGURE 1 shows a fragmentary section through a valve with a rotatable plug in the closed position, with a sealing ring according to the invention arranged in the plug in a suitable manner for sealing off the pressure.

In FIGURE 1, a valve plug or closure member 3 provided with a flow bore 4 is mounted in a housing or body member 1 provided with a flow bore 2. There may be a comparatively large gap, of about 1 to 2 mm. in width, between the inner wall of the housing 1 and the curved surface of the plug 3. Moreover, the inner wall of the housing does not need to be accurately machined.

A recess in the form of a cylindrical blind bore having an end face 5 and a side wall 12 is provided in the plug 3. A sealing ring mounted in this recess and guided by the side wall 12 comprises a rigid outer supporting ring 8 and an inner ring 9 of a resilient material, for example rubber or a suitable synthetic material.

The resilient ring 9 is longer than the outer supporting ring 8 and projects beyond this in the direction of the end face 5 of the recess. Here the ring 9 also has an external diameter $a$ which corresponds substantially to the external diameter of the supporting ring 8, and here it is formed into a sealing lip which bears against the side wall 12 forming the guide surface for the sealing ring.

That portion of the resilient ring 9 having the larger diameter $a$ is preferably constructed in the form of an annular shoulder 14 which bears in the axial direction against the rounded end face of the supporting ring 8 remote from the sealing surface 7. This facilitates removal of the resilient ring 9 from the sealing surface 7 in the unpressurized condition.

The resilient ring 9, at its end face 13 adjacent to the sealing surface 7 of the housing 1, is preferably provided with a chamfer 20 on its inner edge. As a result, the end face 13 likewise becomes movable in the manner of a sealing lip and in addition any initial tendency of the inner edge of the resilient ring 9 to roll with respect to the inner wall of the housing or sealing surface 7 is avoided.

It should be borne in mind that a comparatively soft material (Shore hardness about 45–50) can and should be used for the resilient ring 9 in order that the end face 13 of the ring 9 may be able to adapt itself to irregularities in the sealing surface resulting from the machining and also in order that the resilient material may be pushed towards the sealing surface as a result of the force exerted by the conduit pressure on its inner end face 15 remote from the sealing surface 7.

The end face 13 of the resilient ring 9 adjacent to the sealing surface 7 should stand somewhat back from the adjacent end face of the supporting ring 8 in the unpressurized condition in order that, in the initial stage of operation of the valve, when a portion of the end face 13 initially passes out of range of the sealing surface 7 into the flow bore, the conduit pressure may immediately act on the end face 13 round its whole circumference and so lift it from the sealing surface. As a result, the resilient ring 9 is protected from wear during operation. This effect is also obtained, if not so directly, when the resilient ring 9 is flush, at its end face 13, with the end face of the supporting ring 8.

Movement of the resilient ring 9 away from the sealing surface 7 at the beginning of the opening is also encouraged by the flow of liquid which occurs. The medium in the conduit can actually escape through the gap 6 between the plug 3 and the housing 1 and in the region of the opening gap which appears it has a dynamic pressure component which presses on the end face 13 of the resilient ring and thus suddenly lifts the whole seal. By this means, the flow is also prevented from entraining the ring 9 thus causing downward pressure.

In FIGURE 1, a retaining ring 10, which holds the resilient ring 9 in its supporting ring 8, is shown inside the ring 9. In this case it is unnecessary (and may even be harmful if the resilient ring 9 is made of a relatively hard material), to secure the ring 9 to its supporting ring 8, for example by means of an adhesive connection, because under such conditions the ring 9 cannot flow. Nevertheless, it is possible to connect the ring 9 to the retaining ring 10 by means of an adhesive connection. The retaining ring 10 should not, however, extend as far as the sealing surface 7. In addition, a separate arrangement of the resilient ring 9 permits easier and cheaper replacement thereof, as may be necessary for example, with corrosive media in the conduit.

A plate 16, which is perforated with circumferentially-spaced bores 17 for the passage of the pressure medium, bears against the end face 15 of the resilient ring 9 and may also bear against the retaining ring 10. Plate 16 has a central integral cup 18 opening toward the face 5. The plate 16 is biased against the end face 15 by means of a compression spring 19 within cup 18 and bearing against the end face 5 of the recess in the plug 3. The spring forces the sealing ring with a certain initial pressure against the sealing surface 7. By this means, a sealing action is obtained, even with initially low conduit pressures in the closed position, as a result of the fact that the outer end face of the supporting ring 8 bears against the sealing surface 7. Then the pressure builds up quickly and becomes effective on the end face 13 of the resilient ring 9. The plate 16, the cup 18 and possibly also the retaining ring 10 may consist of one piece.

The plate 16 and the spring 19 may be replaced by members made of rubber or other resilient material and fitted to, or preferably integral with, the end face 15 of the ring 9 remote from the sealing surface 7, the said members bearing against the end face 5 of the recess.

Since the external diameter $a$ of the end face 15, the lip 11 of which bears tightly against the side wall 12 of the recess 5, is larger than the internal diameter of the supporting ring 8, and in particular larger than the internal diameter $b$ of the resilient ring 9 at the end face 20 bearing against the sealing surface 7, the ring 9 is pressed against the sealing surface 7 with a force which is proportional to the pressure of the fluid in the conduit and the area of the annular surface having the external diameter $a$ and the internal diameter $b$.

Since the supporting ring 8 bridges the gap 6 between the plug 3 and the housing 1, the resilient material cannot be pressed into the gap 6 by the pressure of the fluid in the conduit.

Reference will now be made to FIGURES 2 and 3 in which, for like parts or parts which are similar as regards their function, the reference numerals used in FIGURE 1 for these parts are used.

In the housing 1, which comprises the flow bore 2, there is mounted a slide member 3 which is actuated by a slide rod 21. This slide rod 21 may be displaced axially, either directly or by remote control, by a mechanical, hydraulic pneumatic or electro-magnetic actuating device (not shown). There may be a comparatively large gap between the inner wall of the housing 1 and the surfaces of the slide member 3 adjacent to these wall surfaces, and the inner wall of the housing does not need to be precision machined.

Recesses on each side of the slide member 3 each consist of an end face 5 and a side wall 12. A sealing ring, which is guided on the side wall 12, is mounted in each of these recesses. The sealing ring in the embodiment shown in FIGURE 2, again consists of a rigid outer supporting ring 8 and a resilient inner ring 9, the ring 9 projecting beyond the outer supporting ring 8 in the direction of the end face 5. In this case, the outer supporting ring 8 bears against an annular shoulder on the resilient inner ring 9 which is constructed in the form of a sealing lip 11 at the end adjacent to the end face 5. The supporting ring 8 prevents the resilient material from being pressed in and damaging the ring 9 as a result of the conduit pressure in the gap between the housing 1 and the shut-off member 3.

A rigid retaining ring 10 is again mounted in the interior of the resilient inner ring 9. One end face of the ring 10 bears against the housing 1 and its other end face terminates inside the resilient inner ring 9 at a distance from the end face 15 thereof remote from the sealing surface 7 on the housing.

A plate 16[1] in the left-hand portion of FIGURE 2, which lies between the sealing ring and the end face 5, is provided with a through bore 17[1] of large diameter, but it is also possible to provide one or more bores of smaller diameter, like the single bore 17[2] in the plate 16[2] as shown in the right-hand portion of FIGURE 2. The perforated plates 16[1], 16[2] are provided with a circumferential recess, the end face 22 of which is associated with the end face 15 of the resilient inner ring 9, and the surface 23 of which is mounted for displacement in the rigid retaining ring 10, in which case the surface 23 may comprise a plurality of peripheral incisions 24 which end immediately in front of the end face 22 of the recess. Between the plate 16 and the end face 5 of the recess in the shut-off member there are arranged a plurality of compression springs 19 which through the plate 16, urge the sealing ring with a certain initial tension against the sealing surface 7, as a result of which a certain sealing action is obtained in the closed position with initially low pressures in the conduit.

The action of the seals shown in FIGURE 2 corresponds to that described with reference to FIGURE 1. In this case, the pressure medium passes through the bore 17[1] or 17[2] and acts on the end face 15. If the plate 16[1] or 16[2] is additionally provided with peripheral incisions 24, the pressure medium can also pass through these incisions to the end face 15, should the plate 16[1], 16[2] be initially lifted from the inner ring 9 as a result of the pressure in the conduit.

The sealing ring may also be constructed in one piece, as shown in FIGURE 3, and may be made of synthetic material. The sealing ring 25 has a cross-section which is substantially similar to that of the ring composed of three parts shown in FIGURE 2. Here, again, a sealing lip 11' is provided which, as a result of a peripheral notch 26, has a certain mobility in order to obtain sealing against the side wall 12 of the recess in the shut-off member under the action of the pressure in the conduit. With this construction, too, the sealing ring 25 is mounted for axial displacement in the recess in the shut-off member.

In the left-hand half of the example shown in FIGURE 3, the plate 16[3], which consists of a curved spring plate with bores 17[3], bears with its outer curved surface against the end face 5 of the recess in the shut-off member.

In the right-hand half of the example shown in FIGURE 3, a resilient annular tube 27, which performs the same function as the resilient curvature in the plate 16[3], is inserted between the plate 16[4] and the end face 5, near the periphery of the plate, and is provided with one or more bores 17[4].

Naturally, it is possible to provide the right-hand and left-hand halves of the slide valve shown in FIGURES 2 and 3 with plates 16[1], 16[2], 16[3], 16[4] or with any possible combination thereof. It is likewise also possible to provide the slide member 3 with a seal on the one side only.

FIGURES 4 and 5 show a similar slide valve arrangement to that shown in FIGURES 2 and 3, and the general construction of the slide valve therefore does not require detailed description. In these constructions, however, the seals are adapted both for positive-pressure sealing and for negative-pressure sealing and for this purpose the plates 116, 116', 116'' are closed, that is to say constructed without bores. In the embodiment shown in FIGURE 4, peripheral excisions must be present, in contrast to the embodiment shown in FIGURE 2.

When the closed slide valve is subjected to the pressure of the fluid in the conduit on one side or the other in the example shown in FIGURE 4, this pressure displaces the plate 116 towards the adjacent end face 5, as a result of which the plate is lifted with the end face 22 of its recess away from the end face 15 of the ring 9 and the medium in the conduit, passing through the peripheral incisions 24, acts on the end face 15, as a result of which the resilient inner ring 9 is pressed tightly against the sealing surface 7 and the sealing lip 11 is pressed tightly against the side wall 12. If the pressure drops quickly, the pressure prevailing in the space between the plate 116 and the recess in the shut-off member causes the plate 116 to bear against the end face 15 of the sealing ring, as a result of which the resilient inner ring 9 continues to be pressed tightly against the sealing surface 7 while the plate is pushed with its surface 23 into the retaining ring 10.

In the embodiment illustrated in the left-hand half of FIGURE 5, the pressure in the conduit causes the outer zone of the spring plate to be lifted from the end face 15' of the sealing ring, as a result of which the sealing ring is pressed tightly against the sealing surface 7 under the action of the fluid pressure on its end face 15'. If the pressure of the fluid in the conduit drops, the plate 116' again bears against the end face 15' under the influence of its spring tension, as a result of which the pressure prevailing in the space between the plate 116' and the end face 5 maintains the sealing action. The arrangement shown in the right-hand half of FIGURE 5 works accordingly, but in this case the spring action on the plate 116' is exerted by the resilient tube 27.

Naturally, the plate 16 shown in FIGURE 1 may also be constructed without bores so that the shut-off valve shown in this figure is also provided with a seal which is effected under positive and negative pressure. The sealing ring according to the invention can be used not only for rotary valves and slide valves, but for shut-off devices of all types. It offers particular advantages as regards durability, very easy actuation of the shut-off device even under very high operating pressures up to 600 atm. and simple construction of the housing and of the shut-off member, particularly as it permits the use of seals of rubber or other resilient material while avoiding their disadvantages even under high pressure.

What is claimed is:

1. A valve comprising one member having a recess therein, a sealing ring mounted for sliding axial movement within said recess, a second member having a sealing surface for cooperation with the outer edge of said sealing ring to prevent fluid flow through the valve, said sealing ring comprising resilient material and having a lip on the periphery of its inner edge, which lip bears against the side wall of said recess to provide a fluid seal, and a perforated plate disposed within said recess between the end face thereof and said sealing ring, said plate being of smaller diameter than said recess so that the marginal area of said inner edge is exposed, and spring means for biasing said plate and said ring toward the sealing surface of said second member.

2. In a valve of the kind wherein a sealing ring cooperates with a sealing surface and is guided for axial displacement in the direction of the associated sealing surface in a recess, a sealing ring comprising a rigid outer supporting ring and an inner ring of resilient material, the inner ring being constructed, at its end remote from the sealing surface, in the form of a lip seal which bears against the guide surface of the recess, the external diameter of the inner ring at said end being substantially equal to the external diameter of the rigid supporting ring, and at the end adjacent to the sealing surface being substantially equal to the internal diameter of the supporting ring, the depth of the recess being greater than the height of the whole sealing ring, plate means in said recess bearing against the end face of the sealing ring remote from said sealing surface, and a compression spring mounted between the plate means and the end face of the recess in the closure member.

3. A valve comprising a body member having a flow bore extending through the wall thereof, a closure member movable within said body member for sealing off said bore, a recess formed in said closure member, a sealing ring slidably mounted for axial movement within said recess, said sealing ring comprising a rigid outer ring adjacent the side wall of said recess and a resilient ring within said outer ring, said resilient ring having an outer edge which seals against the portion of said body surrounding said bore and an inner edge of substantially greater area than said outer edge, a peripheral lip comprising part of said inner edge which lip bears against the side wall of said recess to provide a fluid seal, and a plate disposed within said recess between the end face thereof and said sealing ring, said plate including spring means for urging said plate and said sealing ring into sealing engagement with said body member.

4. The valve of claim 3 in which said plate is perforated.

5. The valve of claim 3 in which said plate is imperforate.

6. The valve of claim 3 which also includes a rigid retaining ring adjacent the inside diameter of said resilient ring and said plate has a depending portion which abuts the inside diameter of said retaining ring.

7. The valve of claim 6 in which said depending portion of said plate carries a plurality of peripheral incisions to facilitate fluid flow to said inner edge of the resilient sealing ring.

8. A valve according to claim 1, wherein a rigid retaining ring is mounted in the interior of the resilient ring, said ring remaining spaced from the sealing surface even when the outer supporting ring and the resilient ring bear against the sealing surface.

9. A valve according to claim 8, wherein the resilient ring is connected to the rigid retaining ring by means of an adhesive connection.

10. A valve according to claim 2, wherein the plate means comprises a circumferential recess, the end face of which is associated with the end face of the resilient ring and the surface of which is mounted for displacement in the rigid supporting ring, the said surface comprising a plurality of peripheral incisions which end immediately in front of the end face of the circumferential recess.

11. A valve according to claim 1, wherein the sealing ring is provided with a chamfer at the inner edge of the end face adjacent to the sealing surface.

References Cited in the file of this patent

UNITED STATES PATENTS

| | | |
|---|---|---|
| 743,511 | Huxley | Nov. 10, 1903 |
| 763,208 | Robinson | June 21, 1904 |
| 2,599,774 | Ohls | June 10, 1952 |
| 2,700,528 | Blackman | Jan. 25, 1955 |
| 2,791,396 | Reppert | May 7, 1957 |
| 2,844,353 | Gurries | July 22, 1958 |
| 2,853,269 | Shand | Sept. 23, 1958 |
| 2,876,984 | Reppert | Mar. 10, 1959 |
| 2,886,282 | Miller | May 12, 1959 |
| 2,952,437 | Knox | Sept. 13, 1960 |
| 2,970,805 | Pool | Feb. 7, 1961 |